United States Patent [19]
Hollowell, II et al.

[11] Patent Number: 5,590,061
[45] Date of Patent: Dec. 31, 1996

[54] METHOD AND APPARATUS FOR THERMAL MANAGEMENT IN A COMPUTER SYSTEM

[75] Inventors: J. Rhoads Hollowell, II, Sunnyvale; James R. Beninghaus, Cupertino, both of Calif.; Daniel J. Hansen, Jr., Georgetown, Tex.

[73] Assignee: Apple Computer, Inc., Cuptertino, Calif.

[21] Appl. No.: 241,962

[22] Filed: May 12, 1994

[51] Int. Cl.$^6$ .................................................. G06F 15/00
[52] U.S. Cl. .................. 364/571.03; 395/182.22; 395/750
[58] Field of Search .................... 364/483, 492, 364/550, 557, 571.03; 395/750, 575, 182.12, 182.2, 182.21, 182.22

[56] References Cited

U.S. PATENT DOCUMENTS 5,167,024  11/1992  Smith et al. .
5,239,652  8/1993   Seibert et al. ................. 395/750
5,367,670  11/1994  Ward et al. ................... 395/575

FOREIGN PATENT DOCUMENTS 9210032  6/1992  WIPO .

*Primary Examiner*—Emanuel T. Voeltz
*Assistant Examiner*—Edward Pipala
*Attorney, Agent, or Firm*—Blakely, Sokoloff, Taylor & Zafman

[57] ABSTRACT

A method and apparatus for providing thermal management to a computer system where the internal temperature is measured and, based on the temperature, heat generated in the computer system is reduced by turning off a portion of the system. When the portion of the system is off, no power is consumed by that portion. Accordingly, no heat is generated as well. In this manner, the heat generated in the computer system is reduced.

26 Claims, 7 Drawing Sheets

FIG—1

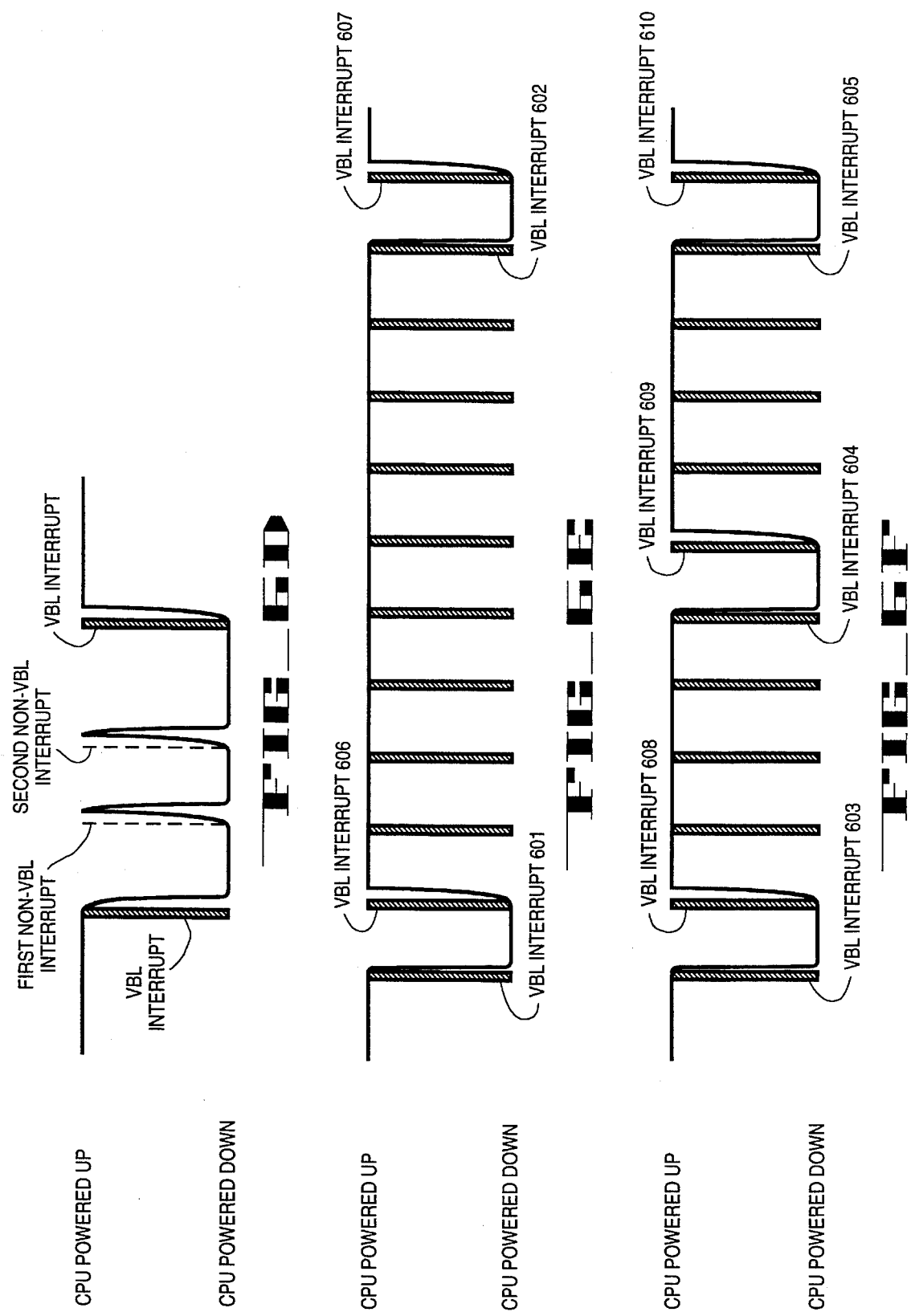

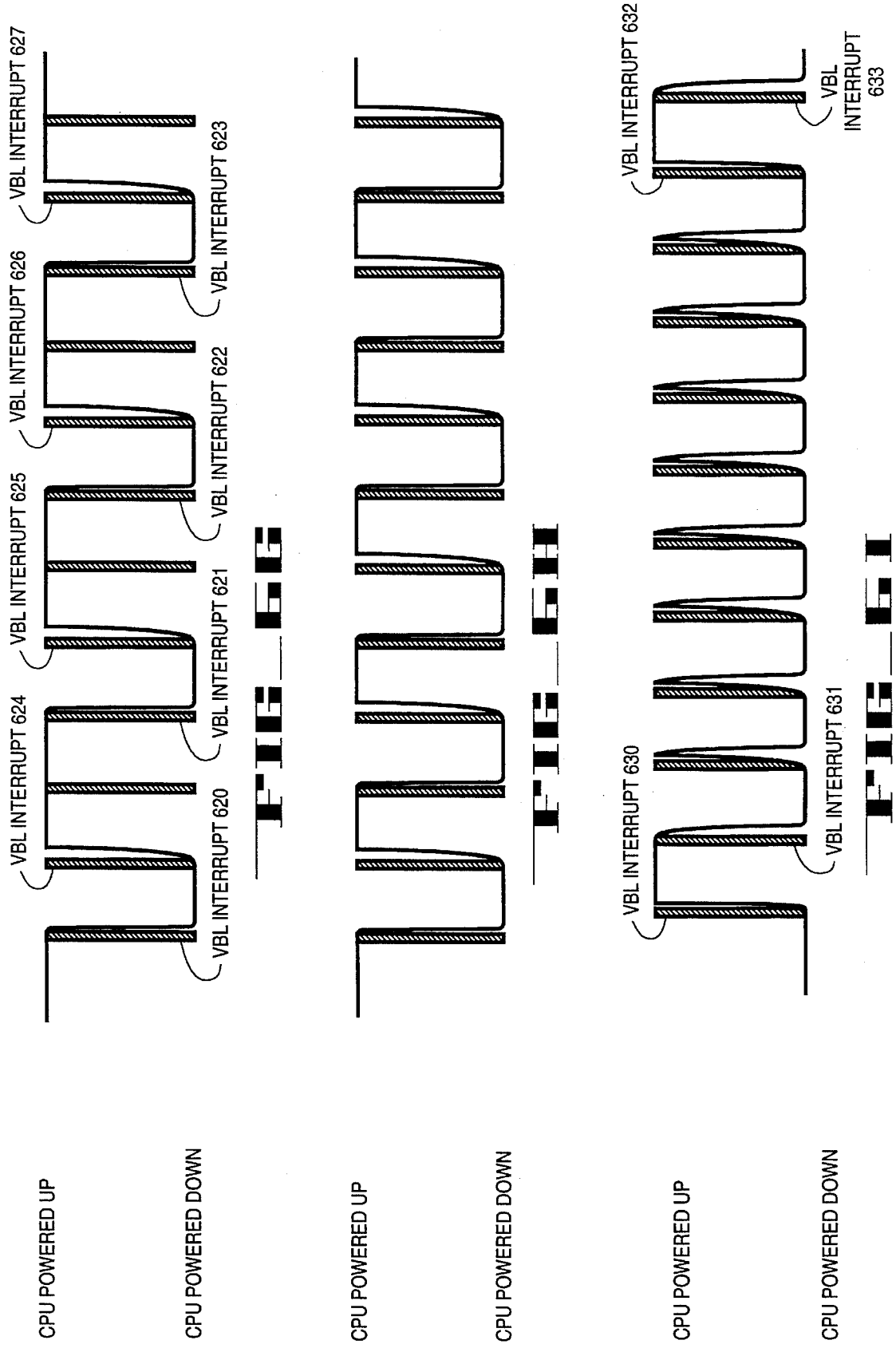

5,590,061

METHOD AND APPARATUS FOR THERMAL MANAGEMENT IN A COMPUTER SYSTEM

FIELD OF THE INVENTION

The present invention relates to the field of computer systems; particularly, the present invention relates to thermal management within computer systems, such as, for instance, laptop and notebook computers.

BACKGROUND OF THE INVENTION

Typically, a computer system contains a processor, a bus, and other peripheral devices. The processor is responsible for executing instructions using the data in the computer system. The bus is used by the processor and the peripheral devices for transferring information between one another. The information on the bus usually includes data, address and control signals. The peripheral devices comprise storage devices, input/output (I/O) devices, etc.

The most heat intensive device in a computer system is the processor, also referred to commonly as the central processing unit (CPU). All processors generate heat. As processors have become faster and more complex, the amount of heat generated as a result of their use has increased. However, the heat generated by a processor is exponentially proportional to the processor clock speed. Therefore, the heat generated has increased by an amount greater than their gain in speed.

As the temperature of the devices in a computer system rises, the temperature within the computer system also rises. A rise in the internal temperature of a computer system may cause problems. For instance, computer components typically have certain temperature operating ranges outside of which they may fail (e.g., they do not run correctly). Also, if the computer system includes a shell, such as one constructed of plastic, the shell may heat to a temperature capable of burning a person who comes in contact with it.

Typical computer systems use cooling systems to compensate for the heat generated by their components. These cooling systems normally include fans in desktop and larger computer systems. Portable computers are common in the market today. These portable computers, referred to as laptop and notebook computers, do not usually have the space or energy capacity available for fan-based cooling systems. Therefore, it is desirable to provide a means for cooling the internal temperature of a portable computer.

Recently, computer systems have began to include power management capabilities. These power management capabilities include the ability to turn off one or more components in a computer system, such as a processor, in order to reduce the power consumption in the system. These power management mechanisms are particularly useful in conserving power, and therefore, extend battery life, in battery-powered portable computers. An example of such a system having power management capabilities is described in U.S. Pat. No. 5,239,652, where the power to a processor is removed for short periods of time during inactivity, while the remainder of the computer system remains powered. The processor is periodically powered at regular intervals to accommodate any processor tasks and requests that might have occurred while the processor was "powered down."

The present invention provides a thermal management mechanism for a computer system. The present invention is particularly useful in a portable system to maintain the internal temperature at a level within the operating ranges of the components. The present invention also manages the internal temperature to ensure that the shell or container for the computer system does not reach a temperature capable of burning human skin.

SUMMARY OF THE INVENTION

A method and apparatus for managing thermal characteristics of a computer system is described. The present invention includes a method and apparatus for sensing the internal system temperature. The present invention also includes a method and apparatus for cycling power to at least one integrated circuit (e.g., the processor) in the computer system as a means for reducing heat generated in the system when the internal temperature in no longer below the threshold temperature. Power is cycled to the integrated circuit(s) by selectively powering the integrated circuit(s) on and off until the internal temperature falls below the threshold temperature.

The present invention selectively powers the integrated circuit(s) on and off such that the intervals of time the IC's are powered on in relation to the interval of time the IC's are powered off may be varied depending on the amount by which the internal temperature exceeds the threshold temperature. Adjustments to the duration of the on and off powered states may be made to compensate for the internal temperature variances attributed to performing the power cycling.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

FIGS. 6A–6I illustrate examples of the powered states of the processor in relation to the periodic interrupts of the present invention.

DETAILED DESCRIPTION OF THE PRESENT INVENTION

Figure 1:
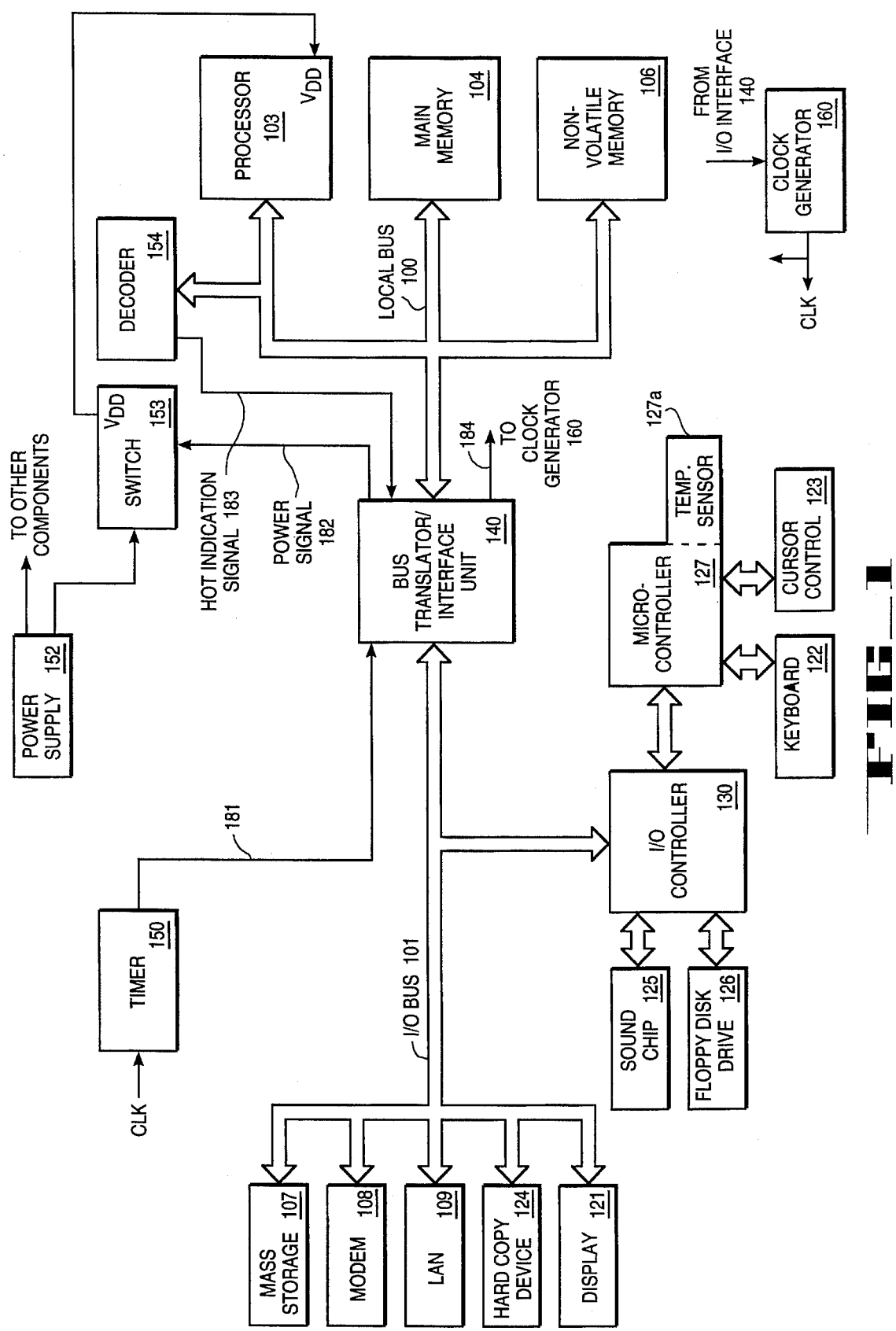
FIG. 1 is a block diagram of one embodiment of the computer system of the present invention.

A method and apparatus for regulating the internal temperature in a computer system is described. In the following detailed description numerous specific details are set forth, such as specific temperatures, temperature thresholds, specific signal names, etc., in order to provide a thorough understanding of the present invention. However, it will be apparent to one skilled in the art that the present invention may be practiced without these specific details. Also, well-known circuits have been shown in block diagram form, rather than in detail, in order to avoid unnecessarily obscuring the present invention.

The present invention provides for thermal management of the interior of a computer system, particularly portable computer systems. The present invention manages the internal temperature of the computer system to maintain the computer system below a specific temperature (e.g., the maximum rated temperature of the computer system). When the internal temperature rises to temperatures approaching this temperature, the present invention cools the interior of the computer system, thereby causing the internal temperature to remain below the upper temperature limit.

The temperature selected to represent the maximum rated temperature is one of design choice based on the components, devices and materials of the computer system. For instance, the temperature could be chosen based on the operating temperature ranges of the integrated circuits within the computer system, wherein the maximum rated temperature would be that temperature below which all the integrated circuits within the system are known to operate as intended. The temperature could also be selected as the temperature above which the plastic shell used to encase a computer system would be heated sufficiently to burn the human skin (when contacted). In the currently preferred embodiment, the temperature used as the maximum rated temperature is chosen to maintain the integrated circuits in their operating temperatures ranges as well as maintain the plastic shell of the computer system below a temperature capable of burning human skin.

The present invention monitors the internal system temperature at periodic intervals (e.g., every 10 seconds) and reduces the internal temperature of the computer system when the internal temperature of the computer system approaches the upper limit (i.e., is at high temperatures). Once the designated temperature has been reached, or exceeded, the periodic monitoring of the internal temperature occurs according to a shorter period (e.g., every second). The present invention reduces the internal temperature by powering up and down integrated circuit chips in the computer system. The powering up and powering down of devices in the computer system is referred to herein as cycling power to the devices. By cycling power to certain integrated circuit chips, the amount of heat generated by these integrated circuits is reduced, such that the integrated circuits, and thus the internal portion of the computer system, are allowed to cool. In the currently preferred embodiment, the present invention removes power from high heat producing integrated circuits, such as the processor, for short periods of time (e.g., milliseconds) until the temperature stabilizes. The powering up and down of a device having its own power management capabilities may also be performed by asserting and de-asserting a pin on the device, causing it to enter and exit a fully powered on state.

Overview of the Computer System of the Present Invention

Referring to FIG. 1, an overview of a computer system of the present invention is shown in block diagram form. The present invention may be implemented on a general purpose microcomputer, such as one of the members of the Apple family of personal computers, one of the members of the IBM personal computer family, or one of several audio computer devices which are presently commercially available. Of course, the present invention may also be implemented on a multi-user system while encountering all of the costs, speed, and function advantages and disadvantages available with these machines. The preferred embodiment of the present invention is implemented on an Apple Power-Book™ computer system developed by the assignee of the present invention.

As illustrated in FIG. 1, the computer system of the present invention generally comprises a local bus or other communication means 100 for communicating information, a processor 103 coupled with local bus 100 for processing information, a random access memory (RAM) or other dynamic storage device 104 (commonly referred to as a main memory) coupled with local bus 100 for storing information and instructions for processor 103, and a read-only memory (ROM) or other non-volatile storage device 106 coupled with local bus 100 for storing non-volatile information and instructions for processor 103.

The computer system of the present invention also includes an input/output (I/O) bus or other communication means 101 for communication information in the computer system. A data storage device 107, such as a magnetic tape and disk drive, including its associated controller circuitry, is coupled to I/O bus 101 for storing information and instructions. A display device 121, such as a cathode ray tube, liquid crystal display, etc., including its associated controller circuitry, is also coupled to I/O bus 101 for displaying information to the computer user, as well as a hard copy device 124, such as a plotter or printer, including its associated controller circuitry for providing a visual representation of the computer images. Hard copy device 124 is coupled with processor 103, main memory 104, non-volatile memory 106 and mass storage device 107 through I/O bus 101 and bus translator/interface unit 140. A modem 108 and an ethernet local area network 109 are also coupled to I/O bus 101.

Bus interface unit 140 is coupled to local bus 100 and I/O bus 101 and acts as a gateway between processor 103 and the I/O subsystem. Bus interface unit 140 may also provide translation between signals being sent from units on one of the buses to units on the other bus to allow local bus 100 and I/O bus 101 to co-operate as a single bus.

An I/O controller 130 is coupled to I/O bus 101 and controls access to certain I/O peripherals in the computer system. For instance, I/O controller 130 is coupled to controller device 127 that controls access to an alpha-numeric input device 122 including alpha-numeric and other keys, etc., for communicating information and command selections to processor 103, a cursor control 123, such as a trackball, stylus, mouse, or trackpad, etc., for controlling cursor movement, and a temperature sensor 127A for measuring the internal system temperature. The system also includes a sound chip 125 coupled to I/O controller 130 for providing audio recording and play back. Sound chip 125 may include a sound circuit and its driver which are used to generate various audio signals from the computer system. I/O controller 130 may also provide access to a floppy disk and driver 126. The processor 103 controls I/O controller 130 with its peripherals by sending commands to I/O controller 130 via local bus 100, interface unit 140 and I/O bus 101.

Batteries or other power supply 152 may also be included to provide power necessary to run the various peripherals and integrated circuits in the computer system. Power supply 152 is typically a DC power source that provides a constant DC power to various units, particularly processor 103. Various units such as processor 103, display 121, etc., also receive clocking signals to synchronize operations within the computer systems. These clocking signals may be provided by a global clock generator or multiple clock generators, each dedicated to a portion of the computer system. Such a clock generator is shown as clock generator 160. In one embodiment, clock generator 160 comprise a phase-locked loop (PLL) that provides clocking signals to processor 103.

I/O controller 140 includes control logic to coordinate the thermal management of the present invention. Several additional devices are included within the computer system to operate with the control logic within I/O controller 140. A timer 150, a switch 153 and a decoder 154 are included to function in connection with the control logic. In one embodiment, decoder 154 is included within bus interface unit 140 and timer 150 is included in I/O controller 130.

Switch 153 is a p-channel power MOSFET, which has its gate connected to the power signal 182, its source to the power supply and its drain to processor's $V_{DD}$ pin.

In the preferred embodiment, processor 103 is a member of the 68000 family of processors, such as the 68040 processor manufactured by Motorola Corporation of Schaumberg, Ill. The memory in the computer system is initialized to store the operating system as well as other programs, such as file directory routines and application programs, and data inputted from I/O controller 130. In the preferred embodiment, the operating system is stored in ROM 106, while RAM 104 is utilized as the internal memory for the computer system for accessing data and application programs. Processor 103 accesses memory in the computer system via an address bus within bus 100. Commands in connection with the operation of memory in the computer system are also sent from the processor to the memory using bus 100. Bus 100 also includes a bi-directional data bus to communicate data in response to the commands provided by processor 103 under the control of the operating system running on it.

Of course, certain implementations and uses of the present invention may neither require nor include all of the above components. For example, in certain implementations a keyboard or cursor control device for inputting information to the system may not be required. In other implementations, it may not be required to provide a display device displaying information. Furthermore, the computer system may include additional processing units.

The operating system running on processor 103 takes care of basic tasks such as starting the system, handling interrupts, moving data to and from memory 104 and peripheral devices via input/output interface unit 140, and managing the memory space in memory 104. In the preferred embodiment, the operating system further provides the functions of monitoring the internal system temperature and causing power to be cycled to processor 103 in response to the internal temperature being a selected threshold temperature approaching the maximum rated temperature.

Timer 150, controlled by clock pulse oscillator 160, generates a periodic interrupt signal, herein referred to as a VBL interrupt signal, to I/O interface unit 140 via line 181 once every approximately 1/60th of a second (frequency of 60 Hz). Combining the VBL interrupt signal with other interrupt signals from peripheral units of the I/O subsystem coupled to the I/O bus 101, I/O interface unit 140 issues an interrupt signal via local bus 100 to processor 103.

When processor 103 receives the interrupt signal, it is interrupted from its normal operation and responds to the interrupt in the conventional manner provided by the operating system. During the interrupt cycle, processor 103 executes its regular interrupt routine which includes a periodic monitoring routine. The periodic monitoring routine performs the functions of updating the real time clock, checking the power supply and sending an auto poll command. The auto poll command is associated with the auto poll method of the preferred embodiment in which the processor 103 automatically interrogates (polls) devices coupled to I/O interface unit 140 to determine the presence of data for transfer. Processor 103 controls the operation of the peripheral units through I/O interface unit 140 by sending its commands via local bus 100 to I/O interface unit 140.

Overview of the Thermal Management of the Present Invention

The present invention manages the internal temperature of a computer system by controlling the duty cycle of integrated circuits within the system. The integrated circuits controlled by the present invention are those producing high amounts of heat. For instance, in one embodiment, the present invention controls the duty cycle of the processor in order the provide thermal management for the system. By lowering the duty cycle of the processor, the present invention lowers the internal temperature of the system.

Figure 2:
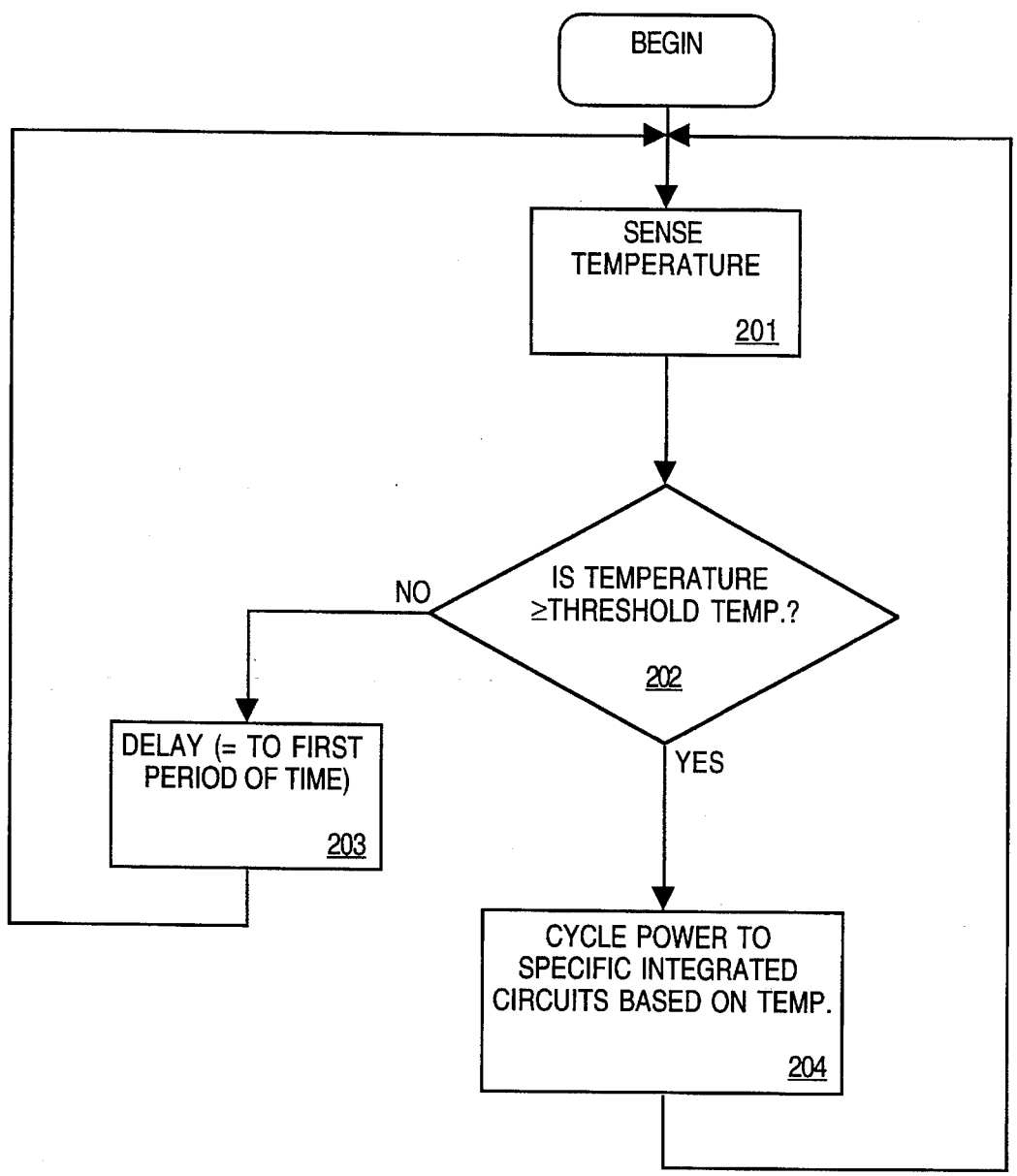
FIG. 2 is a flow chart of the process of the present invention.

FIG. 2 illustrates the process of the present invention. Referring to FIG. 2, the present invention begins by reading the system temperature (processing block 201). The system temperature is measured by the temperature sensor 127A, in cooperation with microcontroller 127 in the computer system. In one embodiment, the temperature sensor 127A is located by the power supply 152 comprised of batteries and is read in a manner well-known in the art. The temperature sensor 127A may be a thermistor, or other well-known temperature sensing device.

A test determines if the internal temperature is greater than or equal to a predetermined threshold temperature (processing block 202). In the preferred embodiment, the threshold temperature is set at 58° C. The internal air temperature of 58° C. corresponds to a surface temperature on some of the internal components approaching their maximum operating temperature of 70° C. If the internal system temperature does not exceed the threshold temperature, then processing continues at processing block 203, where processing undergoes a delay for a first period of time before continuing at processing block 201 where the temperature is again sensed and the process repeats. In one embodiment, the delay is 10 seconds. Thus, the system temperature is monitored periodically, such as, for instance, every 10 seconds. The timing of the period is clocked by the VBL interrupts generated by timer 150. That is, the system temperature is periodically measured at time intervals, the duration of which is based on some specified number of VBL interrupts.

If the test determines that the temperature exceeds the threshold temperature, then present invention performs power cycling on selected integrated circuits in the computer system (processing block 204). In the currently preferred embodiment, the present invention cycles power to the processor 103, thereby lowering its duty cycle. As discussed above, when the present invention performs the power cycling, the processor 103 is turned off and on for various periods of time. The periods of time for the powered off and powered on states are selected in relation to each other based on the amount the internal temperature exceeds the threshold temperature set for the computer system. As power cycling continues, the process repeats and the temperature is again sensed. In one embodiment, the time interval between temperature readings when power cycling is less than the delay associated with processing block 203 so that the temperature is read more often.

One Embodiment of the Thermal Management of the Present Invention

In the currently preferred embodiment, the computer system may be in any one of four stages. In the first stage, the computer system is at normal operating temperature. In the second stage, the computer system is quickly approaching its maximum rated temperature. Depending on the user activity, the computer system power cycles at a progressively greater duty cycle to reduce heat generation. In the third stage, the computer system is at its maximum rated temperature. In this stage, the high heat generating components power cycle to inhibit the unit from exceeding the maximum rated temperature. Finally, in the fourth stage, the computer system is beyond the maximum rated temperature. In this case, the computer system turns the power off and the user is unable to restore power until the temperature decreases to an acceptable level. Turning off the power to the whole computer system may be performed in a manner well-known in the art.

Figure 3:
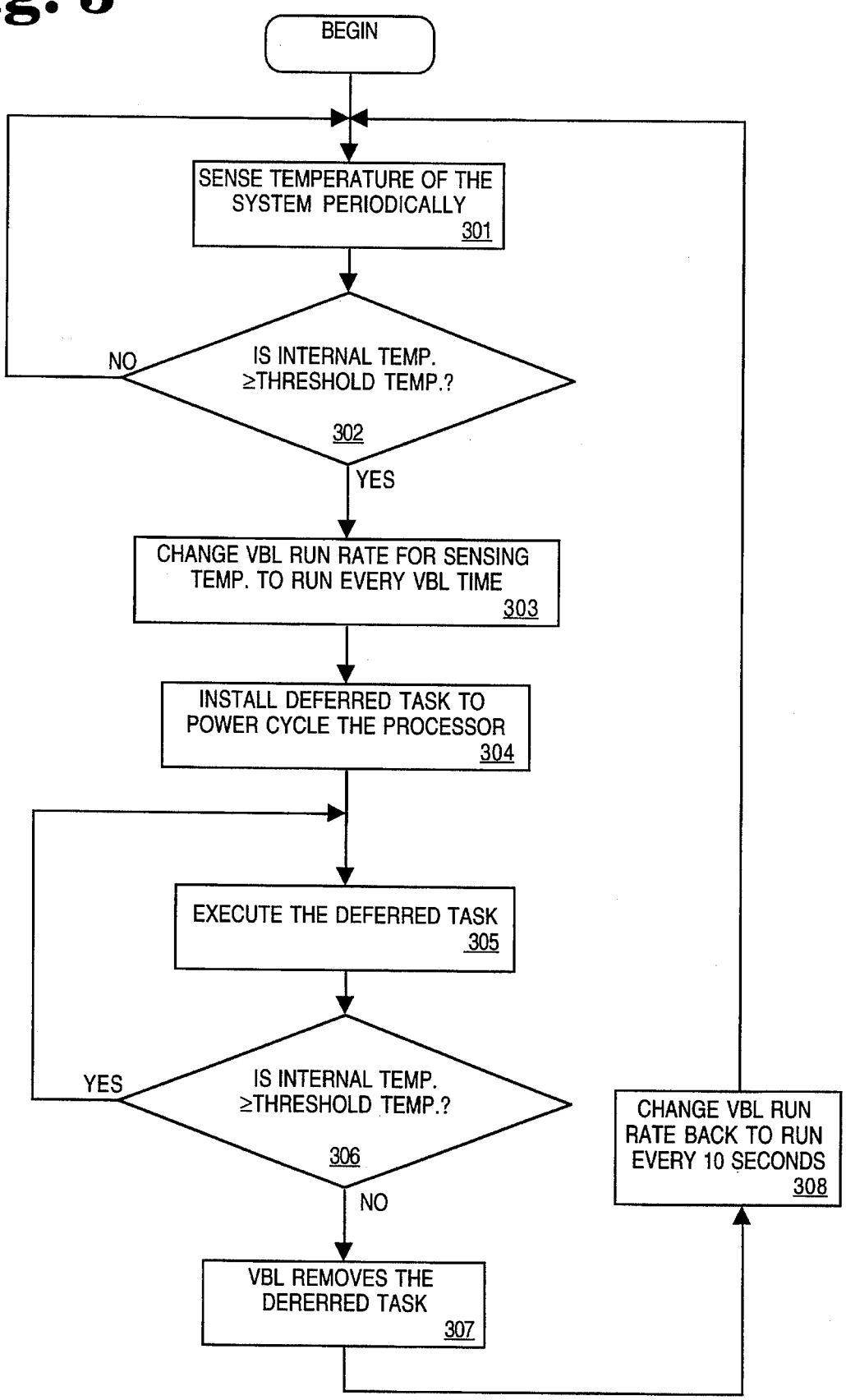
FIG. 3 is one embodiment of the thermal management software process of the present invention.

The thermal management process includes both software and hardware components. FIG. 3 illustrates the one embodiment of the thermal management process of the present invention. Referring to FIG. 3, a ROM boot process occurs during initial system power up. This ROM boot process installs a software task, referred to herein as a VBL task, which executes periodically due to a VBL interrupt, to periodically check the internal temperature (processing block 301 ). The VBL task is initially set to run every 10 seconds and records the temperature received from the temperature sensor 127A via microcontroller 127.

A test determines if the internal system temperature has reached the threshold temperature (processing block 302). If the temperature has not reached the threshold temperature, then processing loops back to processing block 301 and the temperature is again checked at the next designated periodic interval. Thus, as long as the temperature never reaches the maximum rated temperature, then the present invention does nothing and a VBL task checks the temperature every 10 seconds.

Once the VBL task senses that the temperature is at the threshold temperature, the present invention changes the VBL task run rate for sensing the temperature to execute more often (processing block 303). In the preferred embodiment, the VBL task run rate is changed to execute every 60th of a second. In one embodiment, every 60th of a second is once every VBL interrupt time. The VBL task also installs a deferred task to progressively cycle power on and off to the processor 103 (processing block 304). In one embodiment, the deferred task is installed using standard Macintosh™ Deferred Task Manager routines. The deferred task is executed (processing block 305).

A test determines if the temperature has decreased to below the maximum rated temperature (processing block 306). If not, the power cycling continues. If the temperature decreases to below the maximum rated temperature, then the VBL task removes the deferred task (processing block 307) and changes the VBL task run rate back to run once every 10 seconds (processing block 308).

The deferred task runs after all interrupts have been processed and it power cycles the processor 103. In the present invention, the power cycling is performed in conjunction with the occurrence of the VBL interrupts, such that power is removed from the processor 103 or the processor 103 is placed in a no (or low) power consumption state every predetermined number of occurrences of the VBL interrupt. For instance, one embodiment of the present invention uses the following temperature delta over the threshold:

TABLE 1

| °C. Over Threshold | Percentage Cycling | Power Cycle |
|---|---|---|
| 0 | 10% | every 10th VBL |
| 1 | 20% | every 5th VBL |
| 2 | 33.3% | every 3rd VBL |
| 3 | 50% | every other VBL |
| >3 | 90% | 9 out of 10 VBLs |

If the temperature decreases to below the threshold, then the VBL task removes the deferred task and changes the VBL task run rate back to run once every 10 seconds.

In another embodiment, the processor 103 may be power cycled according to the following temperature delta over the threshold:

TABLE 2

| °C. Over Threshold | Percentage Cycling | Power Cycle |
|---|---|---|
| 0 | 16% | every 6th VBL |
| 1 | 20% | every 5th VBL |
| 2 | 33.3% | every 3rd VBL |
| 3 | 50% | every other VBL |
| >3 | 100% | every VBL |

Note that the temperature thresholds may be determined by thermal testing, which is well known in the art.

Note that the execution of the deferred task occurs during the VBL task with the temperature reading, as well as the determination of whether cycling is still required. The deferred task uses a counter for counting the occurrences of the VBL interrupt to identify when the integrated circuits are to be powered down. The control logic changes the power cycling when the temperature changes. Therefore, using the table as shown above, the control logic knows the number of VBL interrupts that the processor is powered off and the number of VBL interrupts that the processor is to be fully powered during each cycle. The counter is reset when a new count is begun.

In one embodiment, once the internal temperature goes beyond the threshold temperature, then the microcontroller 127 periodically senses the temperature. In one embodiment, the microcontroller 127 senses the temperature approximately once every two seconds. If the internal computer system temperature exceeds the maximum rated runtime temperature, then the microcontroller immediately removes power from the whole system.

Thus, in order to provide thermal management for the computer system, the operating system checks the temperature periodically every ten seconds to determine whether internal temperature is below the threshold temperature. From a hardware standpoint, if the internal temperature is no longer below the threshold temperature, the operating system will issue a reserved address via address bus of local bus 100 to decoder 154 at an interrupt. Decoder 154 then recognizes the reserved address and generates a hot indication signal 183 to the control logic in I/O controller 140 that indicates that the internal system temperature is at least at the threshold temperature. In other words, the hot indication signal 183 is asserted when the internal system temperature is no longer below the threshold temperature. Decoder 154 is a decoded comparator which compares addresses over the address bus portion of local bus 100 with the reserved address, and when the reserved address is issued, decoder 154 generates the hot indication signal 183.

Under the control of the hot indication signal 183, I/O controller 140 asserts a power signal 182 output to the switch 153 (which is typically a p-channel power MOSFET) which in turn switches off the $V_{DD}$ power to processor 103 from the power supply 152. While processor 103 is kept off by switch 153 under the control of the power signal 182, other units in the computer system 10 are still fully powered by the power supply 152.

The hot indication signal also causes I/O interface unit 140 to send signal 184 to clock generator 160 to turn off the clocks to processor 103. In one embodiment, signal 184 is received on a pin by clock generator 160 and causes its clock outputs to the processor 103 to be masked while the PLL running with remains in sync.

Controlled thereafter by the other VBL input from timer 150 via line 181 and interrupt input from I/O interface unit 140 over the local bus, I/O controller 140 asserts the power signal 182 periodically to switch 153 such that the power from power supply 152 is resumed on processor 103 for a predetermined time interval following the occurrence of each VBL interrupt. The frequency of the periodic VBL interrupt signal is not necessarily ⅟₆₀th of a second, but is a workable frequency providing a periodic interrupt. In other computer systems, any desired frequency signal could be required.

To turn the processor 103 back on, the power signal 182 coupled to switch 153 is deasserted, such that processor 103 is brought back to full power supply of $V_{DD}$ by switch 153. Processor 103 then interrogates devices that need to be polled and does other housekeeping work which may be specified by the operating system as dictated by the user. During each power on interval, processor 103 also runs the operating system to determine whether full power supply should be resumed on processor 103. If the power off interval preceding the power on interval was instigated in response to the internal system temperature being high, then the operating system causes the processor 103 to return to the power off state. If the operating system determines that processor 103 is requested to resume its normal operation because that internal system temperature is within the acceptable range, then the hot indication signal 183 is deasserted on I/O controller 140. The periodically power signal 182 applied to switch 153 by I/O controller 140 then becomes constantly deasserted.

In short, the thermal management arrangement for processor 103 of computer system is achieved by having the operating system running on processor 103 check at a predetermined regular time interval the internal temperature of the computer system. If the operating system determines that the internal system temperature is at least at a threshold temperature, it issues a signal representative of the temperature state. The signal is sent out of processor 103 through the address bus of local bus 100 and is decoded by decoder 154 to become the hot indication signal 183 signal. Decoder 154 then applies the hot indication signal 183 signal to I/O controller 140. Controlled by the hot indication signal 183 signal, I/O controller 140 outputs the power signal 182 to switch 153 to remove the $V_{DD}$ power supplied by the power supply 152 from processor 103. Timer 150 runs even when processor 103 is powered off. It provides the periodic VBL interrupt signal at a predetermined time interval which in this case happens to be approximately ⅟₆₀th of a second. The periodic VBL interrupt signal is applied to I/O controller 140 to ensure the power signal 182 is deasserted periodically to switch 153. By periodically asserting and de-asserting power signal 182, full power supply $V_{DD}$ is supplied to processor 103 for predetermined time intervals. By running the processor 103 periodically, the internal temperature is reduced. Running periodically, processor 103 can also interrogate (poll) the peripheral devices that are needed for polling and do other system housekeeping work which the operating system may require as specified by the user. In this case, the user does not perceive a difference. The conventional I/O interface unit 140 includes, as part of its normal circuitry, a polling buffer (not shown) that stores status information about the peripheral devices, including particularly floppy disc driver 126.

Both memory 104 and I/O interface unit 140 are powered separately from processor 103. During the power cycling period for processor 103, memory 104 and I/O interface unit 140 are fully powered. I/O interface unit 140 is further coupled to a frame buffer memory (not shown) which is also separately powered with processor 103. During the power cycling period for processor 103, I/O interface unit 140 obtains information from frame buffer memory and maintains the information displayed on the screen of display 121. In this way, the user does not perceive a difference in the computer's operation even though the processor is off.

During each power on interval, the operating system is run to decide whether normal operation on processor 103 is required and, if so, resume the normal power supply to processor 103 by deasserting the hot indication signal 183 applied to I/O controller 140. Once processor 103 is powered to operate full time, I/O controller 140 will not respond to a VBL interrupt or any other interrupt signal until next hot indication signal 183 is received.

By this arrangement, processor 103 is only powered on at a given frequency when the internal temperature is greater than or equal to the threshold temperature. During each power on interval, processor 103 continues normal operation and determines when normal power supply should resume on processor 103.

Note that when the processor is undergoing power cycling, the occurrence of a VBL interrupt is not the only source that can cause the power to be reapplied to the processor. There are numerous activities that cause the processor to become powered up. For instance, network activity, user activity (e.g., a mouse movement, key depression, etc.), and application installed interrupt tasks (e.g., wake-up timer times out) may cause the processor to exit the reduced power consumption state during a VBL induced powered down (as well as other power downs).

When an activity occurs that causes the processor to become powered up from a thermal managed reduced activity state, the processor performs any pending requests or tasks. Once complete, the processor examines the state from which it exited. The state may be inferred from the type of interrupt that caused the exit from the low power mode and/or may be determined by reading RAM used by the operating system. If the processor exited a state in which it entered to perform thermal management, then the processor returns to that state. The amount of time the processor is powered up to handle the interrupt is short in comparison to the time in the powered down state.

The computer system may inform the user that the computer system is power cycling. By informing the user, the user may be self-assured of why the computer system responds slowly to the user's inquiries and actions.

Figure 4:
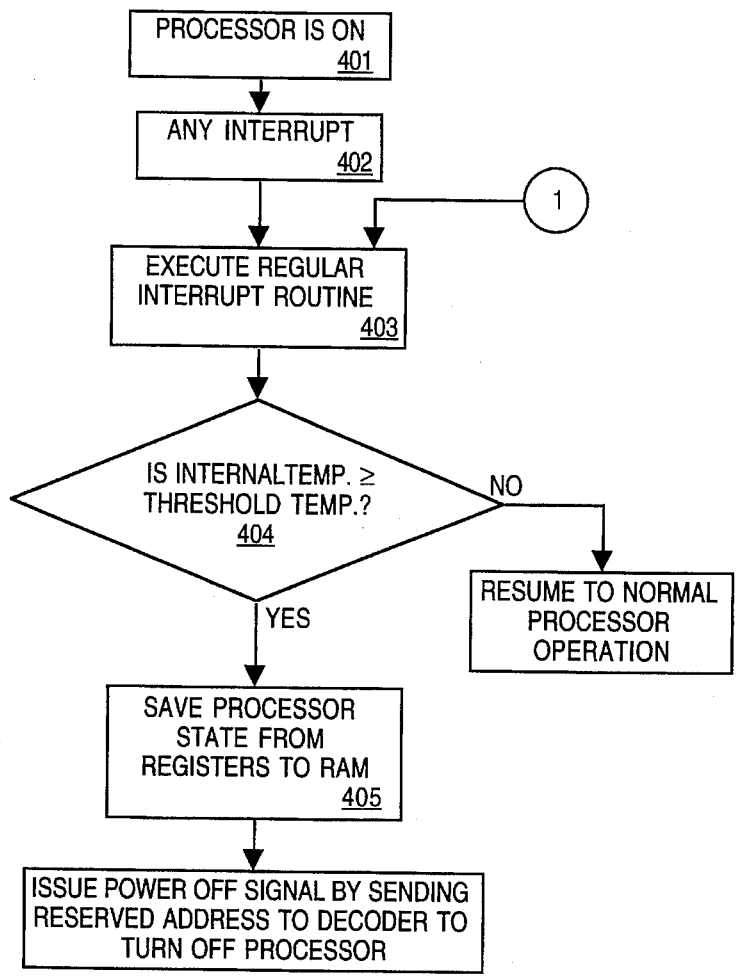
FIG. 4 is a flow chart of the hardware process to power off the processor.

FIG. 4 is the flow chart illustrating the process of generating the power cycling signal to decoder 154 from which the hot indication signal 183 is derived. In FIG. 4, the process is invoked each time processor 103 determines that the internal system temperature is greater than or equal to the threshold temperature as at step 401. When this occurs, an interrupt is sent to processor 103. As indicated at step 402, processor 103 is set to stop its current processing and execute a conventional interrupt routine at step 403. At step 403, all other interrupts are handled. At step 404, the operating system determines whether internal temperature is no longer below the threshold temperature by re-reading the temperature from the temperature sensor. The operating system then stores the status of processor 103 from the registers of the processor 103 to RAM at step 405 in order to preserve the state of the CPU while it is off. This is done by reading the contents in the known registers in processor 103 and then writing those contents into known locations in RAM by known programming means. At step 406, the operating system issues the power off signal from the address bus of local bus 100 to terminate power supply to processor 103.

Figure 5:
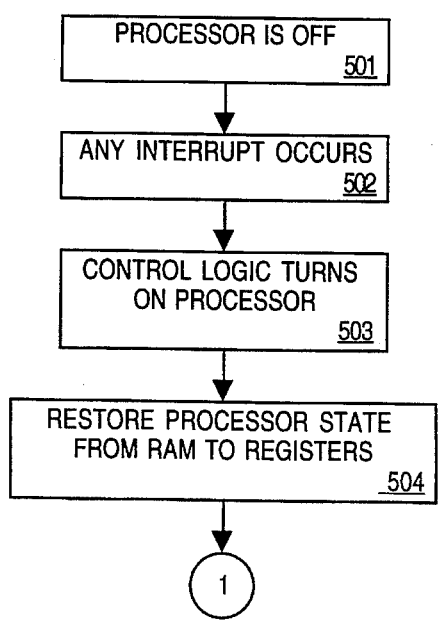
FIG. 5 is a flow chart of the hardware process to power on the processor.

FIG. 5 is a flow chart illustrating the process of providing power to processor 103 when processor 103 has been powered off. In FIG. 5, unlike the process shown in FIG. 4, the process is invoked each time processor 103 is being powered on. Step 501 indicates that processor 103 has been powered off by I/O controller 140 under the power off signal issued by the operating system at step 405 in FIG. 4. Processor 103 remains in its off state until an interrupt occurs at step 502. The interrupt, which may be either the periodic interrupt or may be an interrupt generated by a user input, causes I/O controller 140 to turn on the power supply to processor 103. As processor 103 is turned on by I/O controller 140 at step 503, the operating system starts its operation at step 504 to restore processor state from RAM to the registers of the processor and executes the conventional interrupt routine at step 403. The step of restoring the registers is performed in a routine manner by using known reading means (or commands) to read the information from the known locations in the RAM of memory 104 to the known registers in processor 103. It then checks the bit designating the source of the interrupt at step 405 to determine the source of the wakeup. As described above in FIG. 4, if processor 103 is requested to resume normal operation, the operating system will then go to step 408 to resume the normal operation. If processor 103 was powered up from a thermal management directed power off state, then the operating system will again issue the power off signal to turn off processor 103 again at step 409.

The ON/OFF process of the present invention is repeated until the operating system determines that the computer system has cooled to below the threshold temperature. Processor 103 is then powered on for its normal operation until the operating system once more determines that internal system temperature is greater than or equal to the threshold temperature and generates the power off signal to turn off processor 103.

Figure 6A:
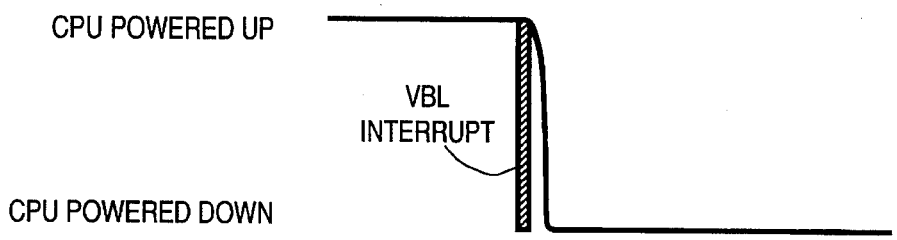
Figure 6B:
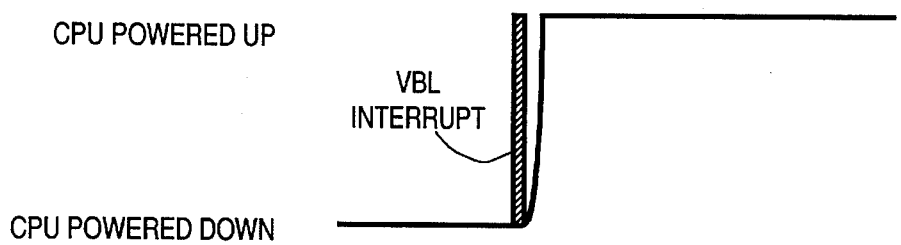

FIGS. 6A–6I illustrate examples of the processor powered states of the present invention. Note in FIGS. 6A–6I, the thick black vertical lines represent VBL interrupts. FIG. 6A is an example of powering down the processor at the occurrence of a VBL interrupt due to the execution of a VBL task. Note that the powering down (and up) is not instantaneous, but happens over a shod period of time (e.g., 0.5 msec). FIG. 6B is an example of powering up the processor at the occurrence of a VBL interrupt due to a VBL task.

Figure 6C:
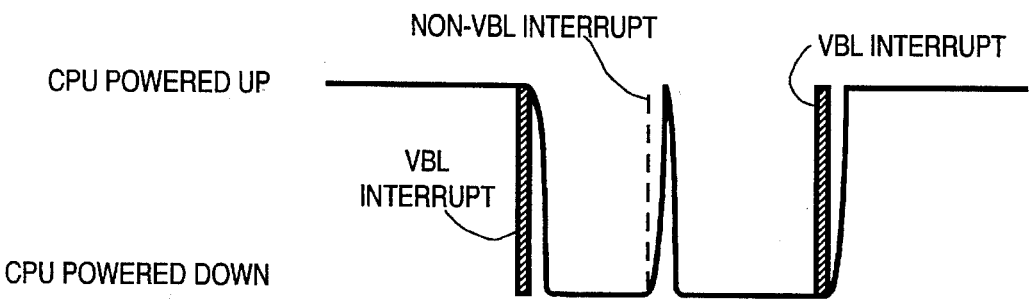

FIG. 6C is an example of the occurrence of a non-VBL interrupt when the processor is in a powered down state. Referring to FIG. 6C, the processor is shown being powered down at the occurrence of a VBL interrupt. Subsequently, a non-VBL interrupt occurs, causing the processor to power back up. The processor is only powered up for as long as necessary to handle the non-VBL interrupt. Then, the processor is powered down until the next VBL interrupt where the processor is powered back up. FIG. 6D is similar to FIG. 6C except there are two non-VBL interrupts occurring while in the powered down state.

FIGS. 6E–6I depict specific examples of the cycling percentages of one embodiment of the present invention. FIG. 6E illustrates the powered state of the processor during 10 percent cycling. Referring to FIG. 6E, the processor is powered down at the occurrence of the first VBL interrupt (601) and the eleventh VBL interrupt (602), and powered up at the second (606) and twelfth (607) VBL interrupts, respectively. FIG. 6F illustrates the powered state of the processor during 20 percent cycling. Referring to 6F the processor is powered down at the occurrence of first (603), sixth (604) and eleventh (605) VBL interrupts and powers up at the occurrence of the second (608), seventh (608) and twelfth (610) VBL interrupts, respectively. FIG. 6G shows the power state of the processor during the 33.3 percent cycling, where the processor is powered down at the occurrence of the first (620), fourth (621), seventh (622) and tenth (623) VBL interrupts and powered up at the second (624), fifth (625), eighth (626) and eleventh (627) VBL interrupts respectively. FIG. 6H illustrates the powered state of the processor during the 50 percent cycling. In this case, the processor is powered down every other VBL interrupt, while the processor is powered up at the occurrence of the remaining VBL interrupts.

FIG. 6I represents the powered state of the processor during 90 percent cycling. Referring to FIG. 6I, the processor is powered up at the occurrence of the first VBL interrupt 630 and remains powered until the occurrence of the second VBL interrupt 631. Thereafter, the processor is powered up and down at each VBL interrupt until the eleventh VBL interrupt 632. At the eleventh VBL interrupt 632, the processor is powered up and remains powered up until the next VBL interrupt 633.

Note that the processor is actually powered up at the occurrence of each VBL interrupt in the present invention to allow the VBL task to be executed. In this manner, the temperature may be sensed and tested at each VBL interrupt.

By powering on and off integrated circuits in the computer system, the temperature of the system may be controlled. This ensures that the integrated circuits consistently remain within the operating temperature ranges. Furthermore, by cycling power to the integrated circuits, the temperature of the shell of the computer remains in a safe temperature.

Whereas many alterations and modifications of the present invention will no doubt become apparent to a person of ordinary skill in the art after having read the foregoing description, it is to be understood that the particular embodiment shown and described by way of illustration is in no way intended to be considered limiting. Therefore, references to details of the preferred embodiment are not intended to limit the scope of the claims which in themselves recite only those features regarded as essential to the invention.

Thus, a thermal management process and apparatus for a computer system has been described.

We claim:

1. A method for regulating the internal temperature of a computer system, said method comprising the steps of:

monitoring the internal temperature of the computer system;

placing at least one integrated circuit within the computer system into a first powered state for a first period of time and then a second powered state for a second period of time repeatedly when the internal temperature is at least at a threshold temperature, wherein the step of placing comprises the step of selecting durations of the first period of time and the second period of time based on an amount the internal temperature exceeds the threshold temperature.

2. The method defined in claim 1 wherein the first powered state comprises a state in which said at least one integrated circuit is not powered and the second powered state comprises a fully powered state.

3. The method defined in claim 1 wherein the step of placing comprises placing said at least one integrated circuit into the first powered state and the second powered state periodically in accordance with a periodic interrupt, wherein the first period of time comprises a first number of occurrences of the periodic interrupt and the second period of time comprises a second number of occurrences of the periodic interrupt.

4. The method defined in claim 3 wherein the step of selecting durations of the first period of time and the second period of time is performed so that the ratio of the first period of time to the second period of time is increased as the amount the internal temperature exceeds the threshold temperature increases and is decreased as the amount the internal temperature exceeds the threshold temperature decreases.

5. A method for regulating the internal temperature of a computer system, said method comprising the steps of:

sensing the internal temperature of the computer system;

cyclically placing an integrated circuit within the computer system into and out of a powered state when the internal temperature is at least at a threshold temperature, wherein each cycle comprises a first time period in which the integrated circuit is in the powered state and a second time period in which the integrated circuit is out of the powered state, wherein the step of cyclically placing the integrated circuit includes adjusting durations of the first time period and the second time period according to an amount that the internal temperature exceeds the threshold temperature, such that a ratio of when the integrated circuit is in the powered state to when the integrated circuit is out of the powered state is adjusted, and wherein said step of cyclically placing the integrated circuit into and out of the powered state continues until the internal temperature falls below the threshold temperature, such that heat generated within the computer system is reduced.

6. The method defined in claim 5 wherein the integrated circuit comprises a processor in the computer system.

7. The method defined in claim 5 wherein said step of adjusting includes the steps of:

increasing the ratio of the second time period to the first time period as the amount that the internal temperature exceeds the threshold temperature increases, and decreasing the ratio of the second time period to the first time period as the amount that the internal temperature exceeds the threshold temperature decreases.

8. The method defined in claim 5 further comprising the step of periodically sensing the internal temperature while cyclically placing the integrated circuit into and out of the powered state.

9. The method defined in claim 5 further comprising the steps of coupling the integrated circuit to a power source and decoupling the integrated circuit from the power source to place the integrated circuit into and out of the powered state respectively.

10. The method defined in claim 5 further comprising the steps of asserting and de-asserting a pin on the integrated circuit to cause the integrated circuit to enter the powered state respectively.

11. A method for thermal management of a computer system having an internal temperature, said method comprising the steps of:

periodically sensing the internal temperature of the computer system at a first time interval while the internal temperature remains below a threshold temperature; and cyclically placing an integrated circuit within the computer system into and out of a powered state when the internal temperature is at least at the threshold temperature, wherein each cycle comprises a first time period in which the integrated circuit is in the powered state and a second time period in which the integrated circuit is out of the powered state, wherein the step of cyclically placing the integrated circuit includes adjusting durations of the first time period and the second time period according to an amount that the internal temperature exceeds the threshold temperature, such that a ratio of when the integrated circuit is in the powered state to when the integrated circuit is out of the powered state is changed, and periodically sensing the internal temperature at a second time interval shorter than the first time interval when the internal temperature is at least at the threshold temperature, wherein the integrated circuit is continually placed into and out of the powered state until the internal temperature falls below the threshold temperature, such that heat generated within the computer system is reduced.

12. The method defined in claim 11 further comprising the step of generating a periodic signal, wherein both the step of periodically sensing the internal temperature at the first interval and the step of periodically sensing the internal temperature at the second interval are performed synchronously with the periodic signal.

13. The method defined in claim 11 further comprising the step of generating a periodic signal, wherein the duration of the first time equals a first number of occurrences of the periodic signal and the duration of the second time period equals a second number of occurrences of the periodic signal.

14. The method defined in claim 13 wherein the step of adjusting durations of the first time period and second time period by comprising the step ..of incrementing or decrementing the second number of occurrences, such that the ratio Of the first number of occurrences to the second number of occurrences is increased or decreased as the second number of occurrences is decreased or increased respectively.

15. The method defined in claims 12 or 13 wherein the periodic signal comprises a periodic interrupt signal.

16. The method defined in claim 11 wherein the integrated circuit comprises a processor in the computer system.

17. The method defined in claim 11 wherein said step of adjusting includes the steps of:

increasing the ratio of the second time period to the first time period as the amount that the internal temperature exceeds the threshold temperature increases, and decreasing the ratio of the second time period to the first time period as the amount that the internal temperature exceeds the threshold temperature decreases.

18. The method defined in claim 11 wherein the ratio of the first time period to the second time period is adjusted for each degree the internal temperature exceeds the threshold temperature.

19. A method for thermal management of a computer system having an internal temperature, said method comprising the steps of:

generating a periodic interrupt signal;

periodically sensing the internal temperature of the computer system every I number of occurrences of the periodic interrupt signal, wherein I is an integer; and cyclically placing an integrated circuit within the computer system out of a powered state for m number of occurrences of the periodic interrupt signal and into the powered state for n number of occurrences of the periodic interrupt signal when the internal temperature is at least at the threshold temperature, and wherein the step of cyclically placing the integrated circuit includes varying a ratio of time when the integrated circuit is out of the powered state to when the integrated circuit is in the powered state according to a number of degrees the internal temperature exceeds the threshold temperature, such that the ratio increases and decreases as the amount the internal temperature exceeds the threshold temperature increases and decreases respectively, wherein said step of cyclically placing the integrated circuit continues until the internal temperature falls below the threshold temperature, such that the heat generated within the computer system is reduced.

20. The method defined in claim 19 wherein the step of cyclically placing the integrated circuit into and out of the powered state further comprises the step of periodically sensing the internal temperature at less than I number of occurrences of the periodic interrupt signal when the internal temperature is at least at the threshold temperature.

21. In a computer system having a processor, an addressable memory for storing data and programs for operation on the processor, a plurality for peripheral data and a power supply for supplying power to the processor, the addressable memory and the plurality of peripheral devices, an apparatus for providing thermal management for the computer system comprising:

a temperature sensor that measures the internal temperature of the computer system;

control logic coupled to and responsive to the internal temperature sensor measuring the internal temperature as at least a threshold temperature, wherein the control logic repeatedly places the processor out of a powered state for a first period of time and into the powered state for a second period of time in cycles to reduce heat generated in the computer system until the internal temperature falls below the threshold temperature, wherein the control logic adjusts the first period of time or the second period of time according to an amount that the internal temperature exceeds the threshold temperature, such that a ratio of when the processor is out of the powered state to when the processor is in the powered state is changed.

22. The apparatus defined in claim 21 further comprising a switch coupled to the power supply and the processor and responsive to the control logic for selectively coupling the power supply to the processor to place the processor in the power state.

23. The apparatus defined in claim 21 further comprising a timer coupled to the control logic, wherein the timer periodically generates a periodic interrupt signal at a predetermined interval, and wherein the first period of time and the second period of time have durations of m number of occurrences and n number of occurrences of the periodic interrupt signal respectively, where n and m are integers.

24. The apparatus defined in claim 21 wherein the control logic periodically reads the internal temperature at a first predetermined interval while the internal temperature is below the threshold temperature and at a second predetermined interval shorter than the first predetermined interval when the internal temperature is at least at the threshold temperature.

25. The apparatus defined in claim 24 wherein the temperature sensor senses the temperature at every occurrence of a periodic interrupt signal when the internal temperature is at least the threshold temperature.

26. A method of managing a computer system comprising the steps of:

periodically executing a first task to determine if the internal temperature of the computer system exceeds a threshold temperature, wherein the first task is executed every n number of occurrences of a periodic interval;

installing a second task to place an integrated circuit in the computer system into and out of a reduced power consumption state to reduce the internal temperature when the internal temperature exceeds the threshold temperature;

executing the second task to place the integrated circuit into the reduced power consumption state for a first period of time and out of the reduced power consumption state for a second period of time to cause power to be cycled to the integrated circuit until the internal temperature falls below the threshold temperature.

* * * * *